(12) United States Patent
Qu et al.

(10) Patent No.: US 10,503,290 B2
(45) Date of Patent: Dec. 10, 2019

(54) COLOR FILTERING SUBSTRATE AND DISPLAY APPARATUS

(71) Applicants: BOE Technology Group Co., Ltd., Beijing (CN); Beijing BOE Optoelectronics Technology Co., Ltd., Beijing (CN)

(72) Inventors: Lianjie Qu, Beijing (CN); Li Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/022,507

(22) PCT Filed: Jul. 28, 2015

(86) PCT No.: PCT/CN2015/085283
§ 371 (c)(1),
(2) Date: Mar. 16, 2016

(87) PCT Pub. No.: WO2016/123932
PCT Pub. Date: Aug. 11, 2016

(65) Prior Publication Data
US 2016/0357278 A1    Dec. 8, 2016

(30) Foreign Application Priority Data

Feb. 6, 2015  (CN) .......................... 2015 1 0065367

(51) Int. Cl.
*G06F 3/041*    (2006.01)
*G02F 1/1333*   (2006.01)
(Continued)

(52) U.S. Cl.
CPC .......... *G06F 3/041* (2013.01); *G02F 1/13338* (2013.01); *G02F 1/133512* (2013.01);
(Continued)

(58) Field of Classification Search
None
See application file for complete search history.

(56) References Cited

U.S. PATENT DOCUMENTS

2007/0211195 A1* 9/2007 Sohn ................. G02F 1/133345
                                                    349/106
2008/0266497 A1* 10/2008 Chen ................. G02F 1/133512
                                                    349/106
(Continued)

FOREIGN PATENT DOCUMENTS

CN    203178966 U    9/2013
CN    203299763 U    11/2013
(Continued)

OTHER PUBLICATIONS

First Office Action for Chinese Patent Application No. 201510065367.6 dated Aug. 15, 2016, 6 pages.
(Continued)

*Primary Examiner* — Alexander Eisen
*Assistant Examiner* — Kebede T Teshome
(74) *Attorney, Agent, or Firm* — Westman, Champlin & Koehler, P.A.

(57) ABSTRACT

Embodiments of the present invention provide a color filtering substrate and a display apparatus. The color filtering substrate includes: a base substrate; and a black matrix layer and a color filtering layer arranged on the base substrate. The base substrate is further provided with a first touch electrode and a second touch electrode configured to form a touch electrical field. The color filtering substrate provided by the present disclosure causes the touch electrical field produced
(Continued)

by the first touch electrode and the second touch electrode to be away from the liquid crystal layer by forming both the first touch electrode and the second touch electrode on the color filtering substrate so as to reduce the mutual effects between the touch electrical field and the display electrical field.

8 Claims, 3 Drawing Sheets

(51) Int. Cl.
*G02F 1/1335* (2006.01)
*G06F 3/044* (2006.01)
(52) U.S. Cl.
CPC ........ *G02F 1/133514* (2013.01); *G06F 3/044* (2013.01); *G06F 3/0412* (2013.01); *G06F 2203/04103* (2013.01)

(56) References Cited

U.S. PATENT DOCUMENTS

| | | | |
|---|---|---|---|
| 2009/0128753 A1* | 5/2009 | Shi | G02F 1/133512 349/106 |
| 2010/0103121 A1* | 4/2010 | Kim | G02F 1/13394 345/173 |
| 2010/0136868 A1* | 6/2010 | Chien | G06F 3/0412 445/24 |
| 2010/0231554 A1* | 9/2010 | Anno | G06F 3/0416 345/174 |
| 2010/0271572 A1* | 10/2010 | Yokogawa | G02F 1/1333 349/96 |
| 2013/0044384 A1 | 2/2013 | Kim et al. | |
| 2015/0015517 A1 | 1/2015 | Zhao | |

FOREIGN PATENT DOCUMENTS

| | | |
|---|---|---|
| CN | 103425327 A | 12/2013 |
| CN | 203519969 U | 4/2014 |
| CN | 104216578 A | 12/2014 |
| CN | 104635372 A | 5/2015 |

OTHER PUBLICATIONS

International Search Report and Written Opinion for International Application No. PCT/CN2015/085283, dated Nov. 11, 2015, 10 pages.

English translation of Box No. V from the Written Opinion of the International Searching Authority for International Application No. PCT/CN2015/085283, 2 pages.

\* cited by examiner

COLOR FILTERING SUBSTRATE AND DISPLAY APPARATUS

CROSS-REFERENCE TO RELATED APPLICATION

This application is a Section 371 National Stage Application of International Application No. PCT/CN2015/085283, filed on Jul. 28, 2015, entitled "Color Filtering Substrate And Display Apparatus", which has not yet published, and which claims priority to Chinese Application No. 201510065367.6, filed on 6 Feb. 2015, incorporated herein by reference in their entirety.

BACKGROUND OF THE INVENTION

Field of the Invention

Embodiments of the present disclosure generally relate to the field of display, and in particular, to a color filtering substrate and a display apparatus.

Description of the Related Art

As display technologies develop rapidly, a touch screen has been applied within widely all over lives of the people. At present, the touch screens may be classified into pendant touch screens, surface cover type touch screens and embedded touch screens, in terms of their structures. The embedded touch screens may embed touch electrodes of the touch screen inside a liquid crystal display screen, which can reduce the thickness of a module in entirety and reduce the manufacturing costs of the touch screens significantly. Thus, they are preferable for various panel fabricators.

One of solutions for a conventional embedded touch screen is shown in FIG. 1. In the solution, a driving electrode 500' is arranged on one side of an array substrate 200' (TFT substrate) while an induction electrode 400' is arranged on one side of a color filtering substrate 100' (CF). Further, in order to prevent disturbance of external signals, a high resistance film layer 600' is arranged on one side of the color filtering substrate 100' away from a liquid crystal layer 300'. However, in the above structure, a touch electrical field between the driving electrode 500' and the induction electrode 400' passes through the liquid crystal layer 300' and the deflection of the liquid crystal molecules in the liquid crystal layer is controlled by a display electrical field between a pixel electrode and a common electrode so as to cause mutual effects between the touch electrical field and the display electrical field.

SUMMARY

In order to solve at least one of the above problems, an embodiment of the present invention provides a color filtering substrate, including: a base substrate; and a black matrix layer and a color filtering layer arranged on the base substrate, wherein the base substrate is further provided with a first touch electrode and a second touch electrode configured to form a touch electrical field.

In an embodiment, the first touch electrode or the second touch electrode is composed of a part of the black matrix layer or the color filtering layer and the first touch electrode or the second touch electrode is electrically insulated from other parts of the black matrix layer or the color filtering layer.

In an embodiment, the first touch electrode is composed of a part of the black matrix layer, and the color filtering layer comprises a first color filter layer which is located in a first color sub-pixel region and electrically conductive, and the second touch electrode is composed of a part of the first color filter layer and is electrically insulated from other parts of first color filter layer, and in the second touch electrode, the first color filter layer is also formed at a position corresponding to the black matrix in the black matrix layer such that respective first color sub-pixel regions are connected with each other.

In an embodiment, the black matrix layer and the color filtering layer are formed on one same side of the base substrate, the color filtering layer further comprising a second color filter layer which is located in a second color sub-pixel region and electrically insulated, and in the second touch electrode, the second color filter layer is also formed on the black matrix in the black matrix layer and located between the black matrix layer and the first color filter layer as an insulating layer between the first touch electrode and the second touch electrode.

In an embodiment, the black matrix layer and the color filtering layer are formed on both sides of the base substrate respectively.

In an embodiment, the black matrix layer is made from black metal or black resin doped with electrically conductive materials and the first color filter layer is made from colored resin doped with electrically conductive materials.

In an embodiment, the electrically conductive materials doped in the black resin and the colored resin comprise at least one of silver nanolines, carbon nanotubes and indium tin oxide.

In an embodiment, the color filtering substrate further includes a protective layer which is formed on the color filtering layer and electrically conductive, and the first touch electrode is composed of a part of the protective layer and electrically insulated from other parts of the protective layer.

In an embodiment, the black matrix layer, the color filtering layer and the protective layer are sequentially arranged on the color filtering substrate, and the second touch electrode is composed of a part of the black matrix layer and electrically insulated from other parts of the black matrix layer, the color filtering layer being formed as an insulating layer between the first touch electrode and the second touch electrode.

In order to solve the above technical problem, another embodiment of the present invention provides a display apparatus including the color filtering substrate according to any one of the above embodiments.

The color filtering substrate provided by the present disclosure causes the touch electrical field produced by the first touch electrode and the second touch electrode to be away from the liquid crystal layer by forming the first touch electrode and the second touch electrode on the color filtering substrate so as to reduce the mutual effects between the touch electrical field and the display electrical field.

DETAILED DESCRIPTION OF PREFERRED EMBODIMENTS OF THE INVENTION

The embodiments of the present invention will be further explained below with reference to the figures and examples. The following embodiments along with the figures are only used to explain the general concept of the present invention, instead of being intended to limit the scope of the present invention.

In addition, for the purpose of explanation, numerous specific details are set forth in the following detailed description to provide a thorough understanding to the embodiments of the present invention. It is obvious, however, that one or more embodiments can also be implemented without these specific details. In other instances, well-known structures and devices are shown in an illustrative manner so as to simplify the drawings.

Figure 1:
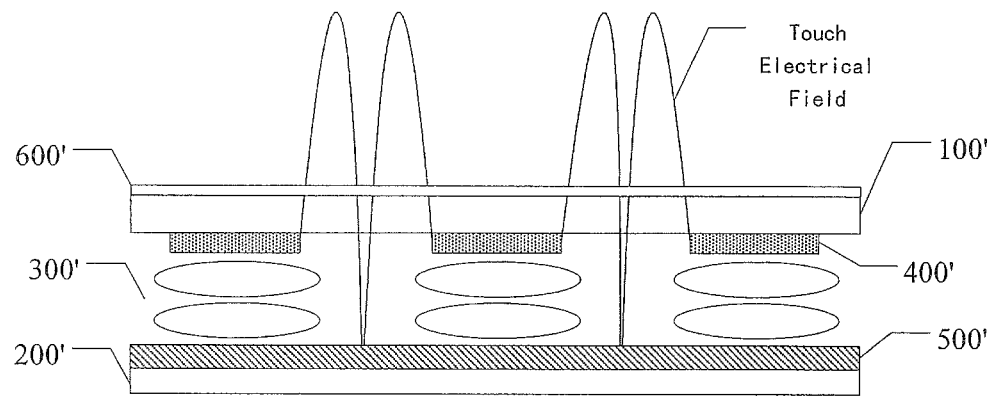
FIG. 1 is a schematic view showing an embedded touch screen in the prior art.
Figure 2:
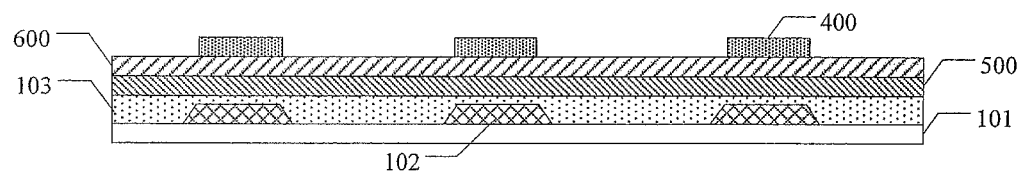
FIG. 2 is a schematic view showing a color filtering substrate provided by an embodiment of the present invention.

FIG. 2 is a schematic view showing a color filtering substrate provided by an embodiment of the present invention. The color filtering substrate includes: a base substrate 101; and a black matrix layer 102 and a color filtering layer 103 arranged on the base substrate 101. In the embodiment, the base substrate 101 is further provided thereon with a first touch electrode 400 and a second touch electrode 500 configured to form a touch electrical field.

In an example, the first touch electrode 400 and the second touch electrode 500 may be arranged on the color filtering layer 103 in stack. An insulating layer 600 is further formed between the first touch electrode 400 and the second touch electrode 500. The first touch electrode and the second touch electrode have shapes that may be provided as required. The shapes are not limited in the present disclosure.

The color filtering substrate provided by the embodiment of the present invention causes the touch electrical field produced by the first touch electrode 400 and the second touch electrode 500 to be away from the liquid crystal layer by forming the first touch electrode 400 and the second touch electrode 500 on the color filtering substrate so as to reduce the mutual effects between the touch electrical field and the display electrical field.

In an embodiment, any one of the first touch electrode 400 and the second touch electrode 500 may be a touch induction electrode (Rx), the other may be a touch driving electrode (Tx). However, when the first touch electrode 400 is the touch induction electrode, the second touch electrode 500 is the touch driving electrode; and when the first touch electrode 400 is the touch driving electrode, the second touch electrode 500 is the touch induction electrode.

In the color filtering substrate provided by the embodiment of the present invention, the touch electrodes (including the first touch electrode 400 and the second touch electrode 500) may be formed separately by additional processes. As an example, the conventional structures in the color filtering substrate may also be used as the touch electrodes.

For example, any one of the first touch electrode 400 and the second touch electrode 500 may be composed of a part of the black matrix layer 102 or the color filtering layer 103 and may be electrically insulated from other parts of the black matrix layer 102 or the color filtering layer 103.

Figure 3:
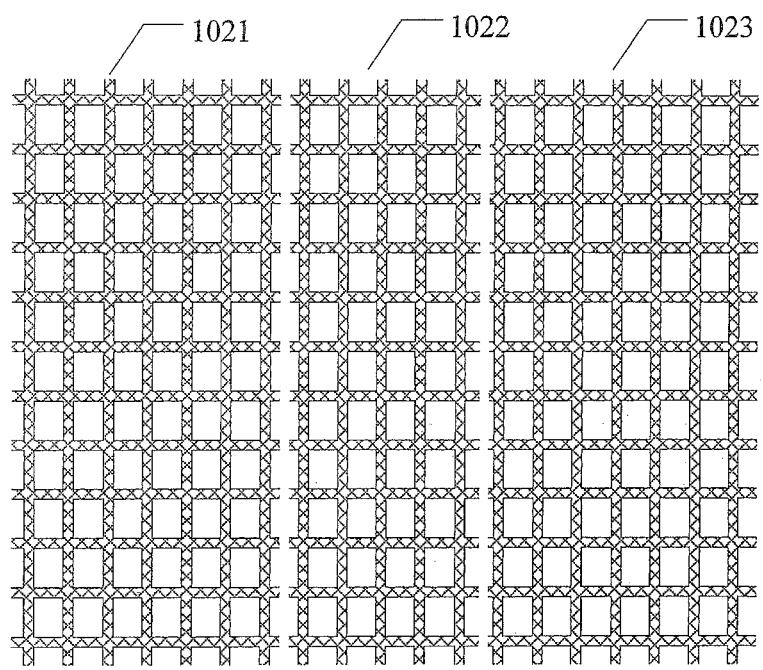
FIG. 3 is a schematic view showing a black matrix layer, which is also used as a touch electrode, provided by an embodiment of the present invention.

As an example, the black matrix layer may also be used as the touch electrode. In this example, the black matrix layer arranged on the color filtering substrate may be divided into areas. As illustrated in FIG. 3, the black matrix layer 102 may be divided into a first area 1021, a second area 1022 and a third area 1023. For example, the second area 1022 of the black matrix layer 102 may be used as the above first touch electrode 400 and electrically insulated from the first area 1021 of the black matrix layer 102 and the third area 1023 of the black matrix layer 102. As an example, the black matrix layer 102 may be made from black metal (such as iron or chromium) or black resin doped with electrically conductive materials. The electrically conductive materials may be silver nanolines, carbon nanotubes, indium tin oxide (ITO) or the like, for example, ITO debris may be doped into the black resin as materials for producing the black matrix layer.

Figure 4:
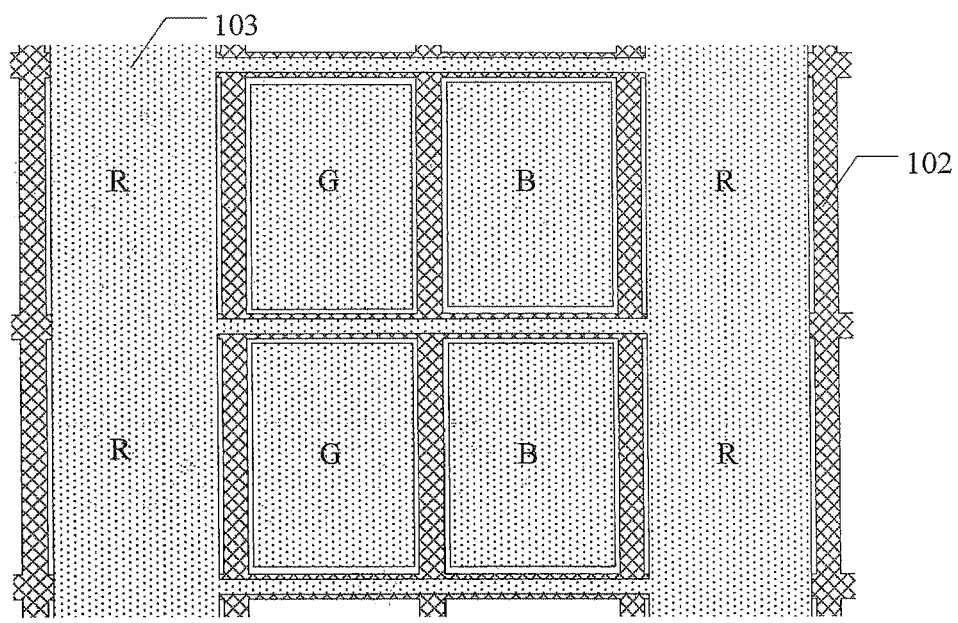
FIG. 4 is a schematic view showing a color filtering layer, which is also used as a touch electrode, provided by an embodiment of the present invention.

As an example, the color filtering layer may also be used as the touch electrode. In this example, the color filtering layer 103 arranged on the color filtering substrate may be divided into areas. For example, for the conventional RGB color filtering substrate, the color filtering layer 103 includes a red filter layer arranged on a red sub-pixel region, a green filter layer arranged on a green sub-pixel region and a blue filter layer arranged on a blue sub-pixel region, and any one of these filter layers may also be used as the touch electrode. For example, if the red filter layer is used as the first touch electrode, the electrically conductive materials may be added into red resin to produce the red filter layer, e.g., materials such as silver nanolines, carbon nanotubes, indium tin oxide (ITO) may be added into the red resin, such that the red filter layer has electrical conductivity and then the red filter layer may be divided into areas and the areas provided as the touch electrode may be electrically insulated from other areas. In the touch electrode, as shown in FIG. 4, the red filter layer is not only arranged on the red sub-pixel region, but also may be overlaid on the black matrix of the black matrix layer so that the respective red sub-pixel regions are connected integrally with each other.

Figure 5:
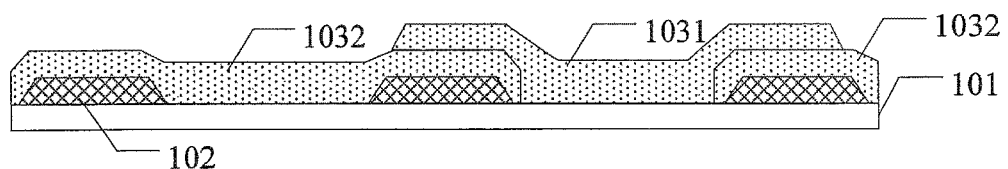
FIG. 5 is a schematic view showing another color filtering substrate provided by an embodiment of the present invention.

In an embodiment of the present invention, the first touch electrode 400 and the second touch electrode 500 may both be obtained by using the conventional structure in the color filtering substrate, as shown in FIG. 5. FIG. 5 is a schematic view showing another color filtering substrate provided by an embodiment of the present invention. The color filtering substrate includes: a base substrate 101; and a black matrix layer 102 and a color filtering layer 103 arranged on the base substrate 101. The black matrix layer 102 and the color filtering layer 103 are formed on one same side of the base substrate 101. The first touch electrode for forming the touch electrical field is composed of a part of the black matrix layer 102 and electrically insulated from other parts of the black matrix layer 102. Their specific arrangement may be those shown in FIG. 3.

The color filtering layer 103 includes a first color filter layer 1031 which is located in a first color sub-pixel region and electrically conductive, and a second color filter layer 1032 which is located in a second color sub-pixel region and electrically insulated. The second touch electrode 500 for forming the touch electrical field is composed of a part of the first color filter layer 1031 and is electrically insulated from other parts of first color filter layer 1031. In the second touch electrode 500, the first color filter layer is also formed at a position corresponding to the black matrix in the black matrix layer such that respective first color sub-pixel regions are connected with each other. Their specific arrangement may be those shown in FIG. 4.

In the second touch electrode 500, as shown in FIG. 5, the second color filter layer 1032 is also formed on the black matrix in the black matrix layer 102 and located between the black matrix layer 102 and the first color filter layer 1031 as an insulating layer between the first touch electrode 400 and the second touch electrode 500. In the embodiment, the second color filter layer is not only arranged on the second color sub-pixel region, but also arranged in the part of the first touch electrode 400 overlapping with the second touch electrode 500 such that the first touch electrode 400 and the second touch electrode 500 are maintained to be electrically insulated from each other to form the touch electrical field. As an example, the black matrix layer 102 may be made from black metal or black resin doped with electrically conductive materials. The first color filter layer may be made from colored resin doped with electrically conductive materials. The above electrically conductive materials may be silver nanolines, carbon nanotubes, indium tin oxide (ITO) or the like, for example, ITO debris or electrically conductive particles formed by carbon nanotubes may be doped into the corresponding color resin as materials for producing the first color filter layer.

For example, for the conventional RGB color filtering substrate, at first, the black matrix layer may be produced by conductive materials and the black matrix layer is also used as a touch sensing electrode, and then the mask for red sub-pixels is changed to deposit a layer of red resin which is not electrically conductive to form the red filter layer and the red filter layer is also used as an insulating layer between the touch sensing electrode and a touch driving electrode. Then, the green filter layer and the blue filter layer are produced and one of them is also used as the touch driving electrode.

In the above embodiment, the black matrix layer 102 and the color filtering layer 103 are formed on the same side of the base substrate 101 and the color filtering layer is used as the insulating layer between the first touch electrode 400 and the second touch electrode 500. Further, the black matrix layer 102 and the color filtering layer 103 may be formed on two opposite sides of the base substrate 101 respectively, for example, the black matrix layer 102 may be produced on the side of the base substrate 101 away from the liquid crystal layer and the color filtering layer 103 may be produced on the side of the base substrate 101 close to the liquid crystal layer such that the base substrate 101 is used as the insulating layer between the first touch electrode 400 and the second touch electrode 500.

Figure 6:
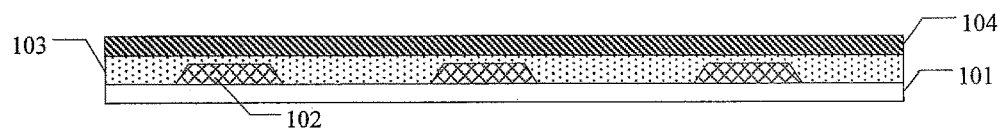
FIG. 6 is a schematic view showing a further color filtering substrate provided by an embodiment of the present invention.

With reference to FIG. 6, FIG. 6 is a schematic view showing a further color filtering substrate provided by an embodiment of the present invention. The color filtering substrate includes a base substrate 101; a black matrix layer 102 and a color filtering layer 103 arranged sequentially on the base substrate and a protective layer (OC layer) 104 which is formed on the color filtering layer 103 and electrically conductive. The first touch electrode 400 is composed of a part of the protective layer 104 and electrically insulated from other parts of the protective layer 104.

The second touch electrode 500 may be composed of a part of the black matrix layer 102 and electrically insulated from other parts of the black matrix layer 102. The color filtering layer 103 is further formed as an insulating layer between the first touch electrode 400 and the second touch electrode 500.

Figure 7:
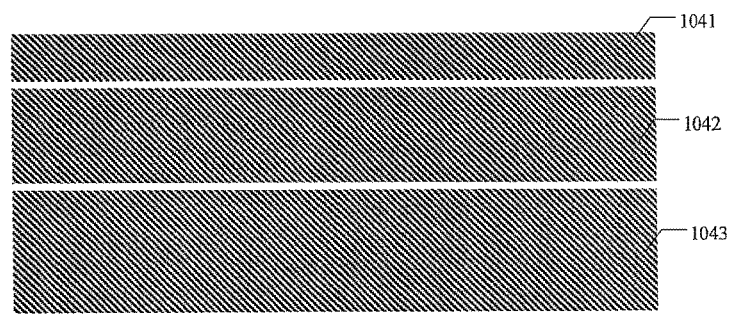
FIG. 7 is a schematic view showing a protective layer, which is also used as a touch electrode, provided by an embodiment of the present invention.

Specifically, for the above protective layer 104, its materials may be obtained by adding conductive materials (such as silver nanolines or ITO) into the conventional materials (such as resin materials) for producing the conventional protective layer. The resistance of the protective layer 104 may be adjusted by changing the quantity of the added conductive materials. Further, the conductive materials (such as ITO) may further be used directly as the materials for producing the protective layer. For the example in which the protective layer is also used as the first touch electrode, the protective layer may also be divided into areas, for example, the protective layer may be formed as slits in shape and arranged to interlace and some areas of the protective layer may be energized while other areas of it may not be energized. The energized areas may be used as the first touch electrode. For example, as shown in FIG. 7, the protective layer 104 is divided into a first area 1041, a second area 1042 and a third area 1043. The second area 1042 of the protective layer 104 may be used as the first touch electrode and the second area 1042 of the protective layer 104 is electrically insulated from the first area 1041 and the third area 1043 of the protective layer 104. In this example, the method for producing the protective layer may be implemented for example by wet etching and dry etching, in terms of materials. In addition, as the protective layer has relatively high transmissivity, it may cover the color filtering substrate in a large area so as to function as a high resistance film to prevent disturbance of the external signals. It may allow a high resistance film layer to be embedded in the protective layer such that the protective layer can be used as both the first touch electrode and the high resistance film layer.

For the black matrix layer 102, it may be made from black metal or black resin doped with conductive materials. It may also be used as the second touch electrode in means similar to that shown in FIG. 3. For example, the black matrix layer may be divided horizontally or vertically into areas and some of the areas may be selected to connect a circuit board to be used as the second touch electrode, which is energized during touching operation and is not energized during non-touching operation.

For the color filtering layer 103, it may still be made from the conventional color resin materials. Due to insulation of the resin materials, the color filtering layer may be formed as an insulating layer between the first touch electrode and the second touch electrode.

The color filtering substrate provided by the embodiment of the present invention prevents the touch electrode field generated by the first touch electrode and the second touch electrode from passing through the liquid crystal layer by forming both the first touch electrode and the second touch electrode onto the color filtering substrate, so as to reduce the mutual effects between the touch electrical field and the display electrical field. In addition, the process and costs for producing the embedded touch screen may be reduced by using the structures in the color filter to produce the touch electrode. And since the above protective layer and the black matrix layer are energized, the external disturbance may also be prevented to improve the signal to noise ratio. A layer of high resistance film produced separately to avoid the disturbance of the external signals will not be necessary, thus the complexity of producing the embedded touch screen will be reduced significantly.

In addition, an embodiment of the present invention also provides a display apparatus including the above color filtering substrate. The display apparatus provided by the embodiment of the present invention may be any products or components having display function, such as a display screen of a notebook computer, a liquid crystal display, a liquid crystal TV, a digital camera frame, a cell phone or a tablet computer.

Figure 8:
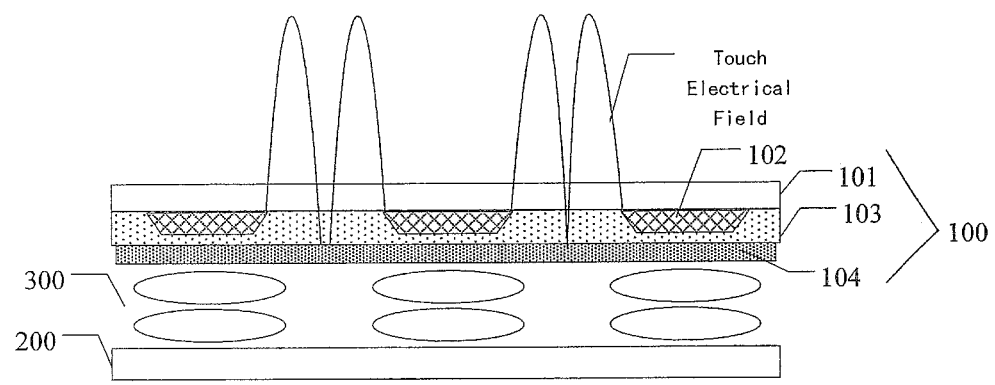
FIG. 8 is a schematic view showing a display apparatus provided by an embodiment of the present invention.

With reference to FIG. 8, FIG. 8 is a schematic view showing a display apparatus provided by an embodiment of the present invention. The display apparatus includes a color filtering substrate 100, an array substrate 200 and a liquid crystal layer 300 between the color filtering substrate 100 and the array substrate 200. The color filtering substrate 100 includes a base substrate 101; a black matrix layer 102 and a color filtering layer 103 arranged sequentially on the base substrate 101 and a protective layer (OC layer) 104 which is formed on the color filtering layer 103 and electrically conductive. The first touch electrode 400 is composed of a part of the protective layer 104 and electrically insulated from other parts of the protective layer 104. The second touch electrode 500 is composed of a part of the black matrix layer 102 and electrically insulated from other parts of the black matrix layer 102. The color filtering layer 103 is further formed as an insulating layer between the first touch electrode and the second touch electrode.

Referring to FIG. 8, as the touch electrical field generated by the first touch electrode and the second touch electrode is located away from the liquid crystal layer 300, so as to reduce the mutual effects between the touch electrical field and the display electrical field.

The above embodiments are only intended to explain the present disclosure, instead of limiting the present invention. It would be appreciated by those skilled in the art that various changes, modifications or equivalents made in these embodiments will also fall within the scope of the present invention, without departing from the principles and spirit of the disclosure. The scope of the present invention is delimited by appended claims.

What is claimed is:

1. A color filtering substrate, comprising:
a base substrate; and
a black matrix layer for shielding a light and a color filtering layer arranged on the base substrate,
wherein the base substrate is further provided thereon with a first touch electrode and a second touch electrode configured to form a touch electrical field to sense a touch operation, wherein the black matrix is divided into areas, and one of the areas is used as one of the first touch electrode and the second touch electrode and is electrically insulated from other areas of the black matrix layer, and wherein the black matrix layer is produced by electrically conductive materials, and wherein the first touch electrode is composed of a part of the black matrix layer, and the color filtering layer comprises a first color filter layer which is located in a first color sub-pixel region and is electrically conductive, and the second touch electrode is composed of a part of the first color filter layer and is electrically insulated from other parts of the first color filter layer, and in the second touch electrode, the first color filter layer is also formed at a position corresponding to a black matrix in the black matrix layer such that respective first color sub-pixel regions are connected with each other.

2. The color filtering substrate according to claim 1, wherein the black matrix layer and the color filtering layer are formed on one same side of the base substrate, the color filtering layer further comprising a second color filter layer which is located in a second color sub-pixel region and is electrically insulated, and in the second touch electrode, the second color filter layer is also formed on the black matrix in the black matrix layer and is located between the black matrix layer and the first color filter layer as an insulating layer between the first touch electrode and the second touch electrode.

3. The color filtering substrate according to claim 1, wherein the black matrix layer and the color filtering layer are formed on two opposite sides of the base substrate respectively.

4. The color filtering substrate according to claim 1, wherein the black matrix layer is made from black metal or black resin doped with electrically conductive materials and the first color filter layer is made from colored resin doped with electrically conductive materials.

5. The color filtering substrate according to claim 4, wherein the electrically conductive materials doped in the black resin and the colored resin comprise at least one of silver nanolines, carbon nanotubes and indium tin oxide.

6. The color filtering substrate according to claim 1, further comprising a protective layer which is formed on the color filtering layer and is electrically conductive, wherein the first touch electrode is composed of a part of the protective layer and is electrically insulated from other parts of the protective layer.

7. The color filtering substrate according to claim 6, wherein the black matrix layer, the color filtering layer and the protective layer are sequentially arranged on the color filtering substrate, and the second touch electrode is composed of the one area of the black matrix layer and is electrically insulated from other areas of the black matrix layer, the color filtering layer being formed as an insulating layer between the first touch electrode and the second touch electrode.

8. A display apparatus comprising the color filtering substrate according to claim 1.

* * * * *